(12) United States Patent
Cornog et al.

(10) Patent No.: US 6,501,197 B1
(45) Date of Patent: Dec. 31, 2002

(54) POWER TOOL AND CONVERTIBLE REMOTE BATTERY PACK THEREFOR

(75) Inventors: Robert A. Cornog, Kenosha, WI (US); Michael R. Mowry, Kenosha, WI (US); William T. Pagac, Kenosha, WI (US); Daniel M. Eggert, Kenosha, WI (US)

(73) Assignee: Snap-on Technologies, Inc., Lincolnshire, IL (US)

( * ) Notice: Subject to any disclaimer, the term of this patent is extended or adjusted under 35 U.S.C. 154(b) by 123 days.

(21) Appl. No.: 09/596,182

(22) Filed: Jun. 16, 2000

Related U.S. Application Data

(60) Provisional application No. 60/139,444, filed on Jun. 16, 1999.

(51) Int. Cl.[7] ................................................. H02J 7/02
(52) U.S. Cl. ...................... 307/150; 320/107; 429/123
(58) Field of Search ............................ 307/150; 429/97, 429/100, 123, 98, 99, 107; 320/107, 111, 112, 114, 128

(56) References Cited

U.S. PATENT DOCUMENTS

| | | | |
|---|---|---|---|
| 3,694,729 A | | 9/1972 | Jones |
| 3,828,201 A | | 8/1974 | Allen, Sr. |
| 3,919,615 A | | 11/1975 | Niecke |
| 4,057,677 A | * | 11/1977 | Mabuchi ..................... 429/100 |
| 4,108,341 A | * | 8/1978 | Pettinger .................... 219/211 |
| 4,397,920 A | * | 8/1983 | trattner ....................... 429/100 |
| D278,386 S | * | 4/1985 | Share ......................... D2/383 |
| 4,748,344 A | * | 5/1988 | Sing ........................... 307/149 |
| 4,818,928 A | * | 4/1989 | Schosser .................... 320/112 |
| 4,876,490 A | | 10/1989 | Kolb |
| 4,917,239 A | | 4/1990 | Smith |
| 5,064,108 A | * | 11/1991 | Headley ..................... 224/259 |
| 5,089,738 A | * | 2/1992 | Bergqvist et al. ............ 310/47 |
| 5,095,259 A | | 3/1992 | Bailey et al. |
| 5,195,354 A | | 3/1993 | Yasui et al. |
| 5,217,395 A | | 6/1993 | Bailey et al. |
| 5,245,516 A | * | 9/1993 | de Haas et al. ................ 2/338 |
| 5,296,315 A | * | 3/1994 | Rein .......................... 429/100 |
| 5,391,972 A | | 2/1995 | Gardner et al. |
| 5,633,096 A | | 5/1997 | Hattori |
| 5,680,026 A | * | 10/1997 | Lueschen .................... 224/674 |
| 5,716,363 A | | 2/1998 | Josephberg |
| 5,738,177 A | | 4/1998 | Schell et al. |
| 5,929,597 A | * | 7/1999 | Pfeifer et al. ............... 320/107 |
| 6,087,815 A | * | 7/2000 | Pfeifer et al. ............... 323/282 |
| 6,104,162 A | * | 8/2000 | Sainsbury et al. .......... 320/107 |
| 6,106,971 A | * | 8/2000 | Spotnitz ........................ 2/102 |
| 6,127,801 A | * | 10/2000 | Manor ......................... 307/66 |
| 6,168,881 B1 | * | 1/2001 | Fischer et al. ............. 292/219 |
| 6,260,978 B1 | * | 7/2001 | St. John ..................... 362/105 |
| 2001/0035736 A1 | * | 11/2001 | Person ....................... 320/114 |

* cited by examiner

*Primary Examiner*—Stephen W. Jackson
*Assistant Examiner*—Roberto J. Rios
(74) *Attorney, Agent, or Firm*—Seyfarth Shaw

(57) ABSTRACT

A battery pack has a housing with a plug portion mateably receivable in a socket of a battery-powered power hand tool on which the battery back is designed to be mounted. The battery pack also has a connector cable with a connector plug at its distal end mateably receivable in the tool socket so that the battery pack can be disposed remotely from the tool. The battery pack can be mounted on tools with which it does not mate by use of an adapter having a plug portion mateably receivable in the tool socket, and an adapter socket mateably receiving the battery pack plug portion. Multiple battery packs may be interconnected on a wearable carrier and connected to the tool by a cable with a plug connector.

5 Claims, 3 Drawing Sheets

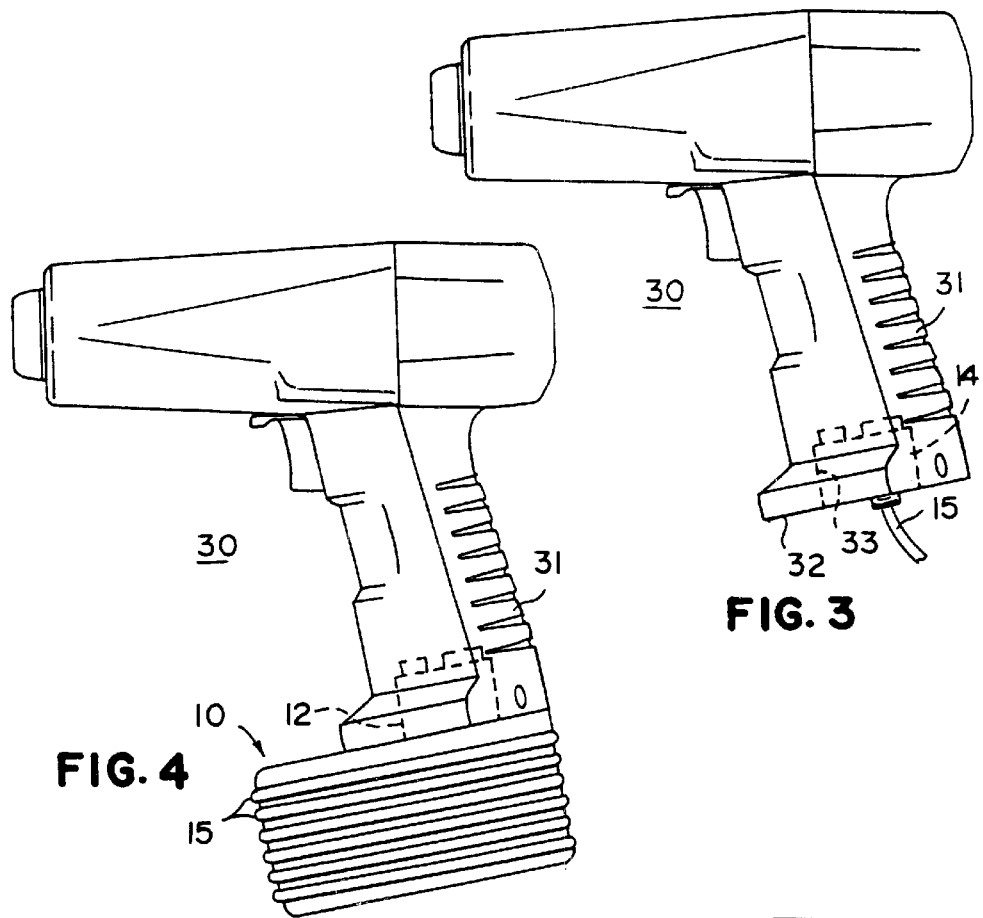
FIG. 4
FIG. 3
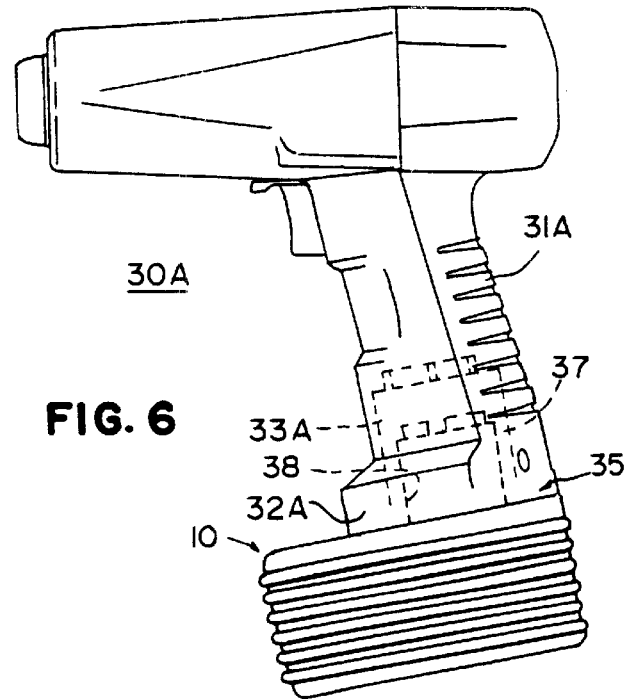
FIG. 6

POWER TOOL AND CONVERTIBLE REMOTE BATTERY PACK THEREFOR

RELATED APPLICATION

This application claims the benefit of the filing date of copending U.S. Provisional Application No. 60/139,444, filed Jun. 16, 1999.

BACKGROUND

This application relates to power tools and, particularly, electrically powered tools. The application relates in particular to battery-powered power tools and battery packs for powering same.

Various types of power hand tools have been utilized for many years, including both electrically powered tools and pneumatically powered tools. Originally, such tools had to be connected by an electrical cable or a pneumatic hose to a source of electricity, typically AC, or a source of compressed air or the like. This limited the usefulness of the tools to the length of the cable or hose connecting the tool to the power source.

Accordingly, cordless electric tools have been provided for a number of years. Such tools typically include a DC electric motor powered by a battery, which is typically embodied in a battery pack which may be either built into the power tool or embodied in a portable battery pack which may be removably attached to the power tool. The size of such battery packs is necessarily limited, otherwise the power tool will become too heavy and/or unwieldy for convenient use. Thus, the power delivery capacity and running time of such cordless power tools is necessarily limited.

SUMMARY

This application discloses an improved battery-powered power tool and battery pack therefor which avoid the disadvantages of prior battery-powered tools, while affording additional structural and operating advantages.

An important feature is the provision of a power tool and a battery pack therefor which can be positioned remotely from the tool being powered.

In connection with the foregoing feature, another feature is the provision of a battery-powered tool of the type set forth, wherein the battery pack can be disposed either on the tool or remotely therefrom.

Another feature is the provision of a battery-powered tool which can have large power delivery capacity and/or running time while maintaining an ergonomic design characterized by relatively small size and light weight.

Still another feature is the provision of a remote battery pack which is usable with existing battery-powered power tools without modification of the tools.

In connection with the foregoing feature, another feature is the provision of an adapter for use with an existing battery-powered power tool to permit it to be powered by the remote battery pack in accordance with the present invention.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 3 is a side elevational view of a power tool with a remote battery pack connected thereto by cable;

FIG. 4 is a view similar to FIG. 3 illustrating the battery pack of FIG. 1 connected directly to the tool;

FIG. 6 is a view similar to FIG. 4 illustrating a use of the adapter of FIG. 5;

DETAILED DESCRIPTION

Figure 1:
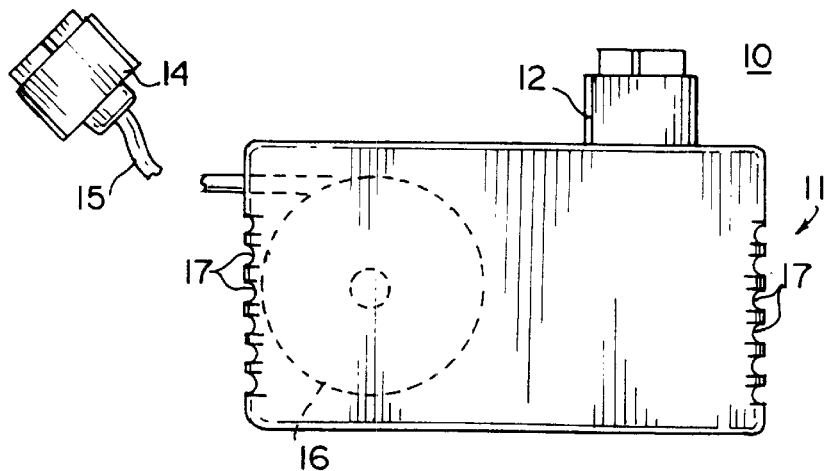
FIG. 1 is a side elevational view of a battery pack in accordance with a first embodiment.
Figure 7:
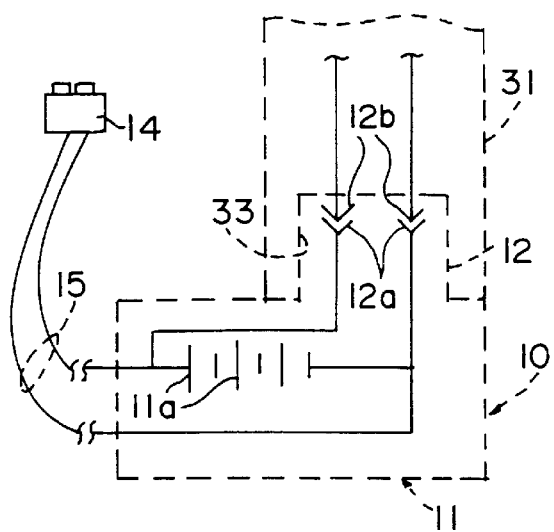
FIG. 7 is a schematic circuit diagram of the arrangement of FIG. 4.

Referring to FIGS. 1 and 7, there is illustrated a battery pack 10, in accordance with a first embodiment. The battery pack 10 has a housing 11, which encloses one or more rechargeable battery cells 11a, sufficient to generate the required output voltage and current. The battery cells 11a may be thin metal film lead-acid battery cells, which may be of the type sold by Johnson Controls under the designation "Inspira," or by Bolder Technologies under the designation "Bolder 9/5 sub-C TMF" (Thin Metal Film). The housing 11 may have an upstanding plug connecting portion 12, which includes electrical contacts 12a adapted for electrical connection to mating contacts 12b (FIG. 7) in an associated power tool. The battery pack 10 is also provided with a connector 14, preferably of the same size and configuration as the connecting portion 12, and connected or connectable by an elongated cable 15 to the battery cells in the housing 11. In the embodiment illustrated in FIG. 1, the cable 15 is stored on a take-up reel 16 mounted in the housing 11, so that the connector 14 is disposed in the housing 11 out of sight when not in use. Alternatively, the bulk of the length of the cable 15 may be permanently disposed outside the housing 11 and either permanently or removably connected thereto. For this eventuality, the housing 11 may be provided with a plurality of grooves 17 in the outer surface thereof to facilitate winding of the cable 15 around the housing 11 for storage purposes.

Figure 2:
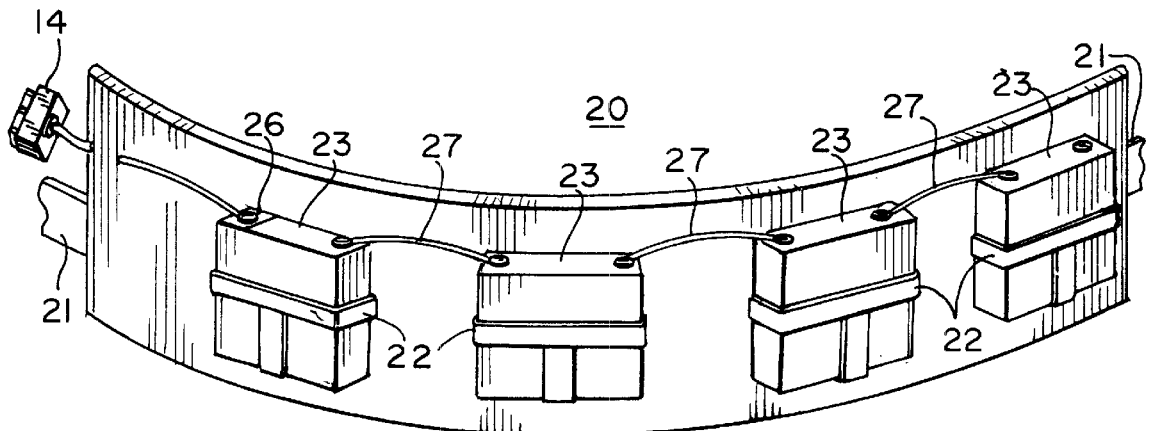
FIG. 2 is a perspective view of a battery pack belt including a plurality of interconnected battery packs in accordance with another embodiment.

Referring to FIG. 2, there is illustrated an alternative embodiment in the nature of a battery belt 20, comprising an elongated strip of any suitable material provided with coupling or buckle portions 21 at the opposite ends thereof and adapted to be fastened around a wearer's waist, shoulder, or the like. The belt 20 is provided with a plurality of sets of retaining straps 22 thereon, which may be Velcro-type straps, for example, for respectively securing in place on the belt 20 a plurality of battery packs 23, which are illustrated in the shape of parallelepipeds, but which could have any desired configuration. Each of the battery packs 23 includes one or more rechargeable battery cells, which may be of the thin metal film lead-acid type. The battery belt 20 is provide with a connector 14, like that of FIG. 1, connected by an elongated cable 15 to one of the battery packs 23. The cable 15 could be permanently connected to the battery pack 23, but is preferably removably connected thereto, as by a suitable connector 26. The battery packs 23 are interconnected by jumper cables 27, which may be configured to interconnect the battery packs in series or in parallel, as desired. In the illustrated embodiment, each of the jumper cables 27 may be a multi-conductor cable, and each of the battery packs has plural terminal locations, each of which may include a pair of terminals, respectively connected to the output terminals of the battery cell configuration. However, it will be appreciated that any of a number of other different types of battery pack terminal configurations and/or cable configurations could be utilized.

The battery pack configurations disclosed herein do not have to be directly mounted on the power tool being powered, as with prior art battery packs. Rather, the battery pack 10 or the battery belt 20 can be located remotely from the tool itself and interconnected thereto by the elongated cable 15. Referring to FIG. 3, there is illustrated a power tool 30, which may be a drill or impact wrench or the like. While the power tool 30 is shown with a generally "pistol grip" configuration, it will be appreciated that the battery packs disclosed herein could be used with other types of power tools, such as screwdrivers, right angle drills or the like. The power tool 30 has an elongated handle 31 with a distal end surface 32 in which is formed a connection socket or receptacle 33 in which the contacts 12b are disposed, the receptacle 33 being specifically designed to receive the connecting portion 12 of the battery pack 10 or the connector 14 of either the battery pack 10 or the battery belt 20. This permits the power tool 30 to be utilized at a location remote from the battery pack or battery belt by a distance limited only by the length of the cable 15. In this regard, the cable 15 is preferably designed with low-loss conductors to minimize power loss.

This arrangement is particularly advantageous for coupling to the power tool battery packs of a size and weight which would normally make them unsuitable for direct mounting on the power tool. Thus, for example, the battery pack 10 could be made of a very large size to increase the power delivery capability and/or the running time of the power tool. In this case, where the battery pack 10 is of a size which would effectively prohibit its direct mounting on the tool, it could be provided without the connecting portion 12. The battery belt 20 is designed to interconnect a plurality of smaller battery packs to obtain the effect of a single large battery pack and is designed to be worn about a user's body, which can accommodate much greater weights than can the user's hand which is manipulating the power tool.

Referring to FIGS. 4 and 7, there is illustrated the tool 30 of FIG. 1 with the battery pack 10 directly connected thereto and mounted thereon by means of the coupling portion 12. In this case the cable 15 is wrapped around the battery pack housing 11, as opposed to being stored in a take-up reel therein. It will be appreciated that, alternatively, the cable 15 could be permanently connected to the power tool and could be stored on a take-up reel therein, in which case the cable would be adapted to be removably connected to the battery pack 10 or the battery belt 20.

Figure 5:
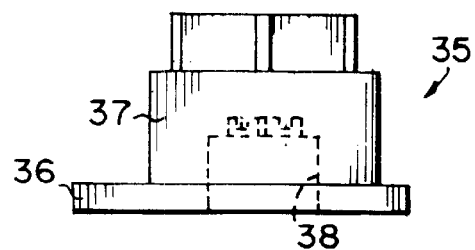
FIG. 5 is a side elevational view of an adapter for adapting the battery pack or belt of FIGS. 1 and 2 to be plugged into an existing power tool.
Figure 8:
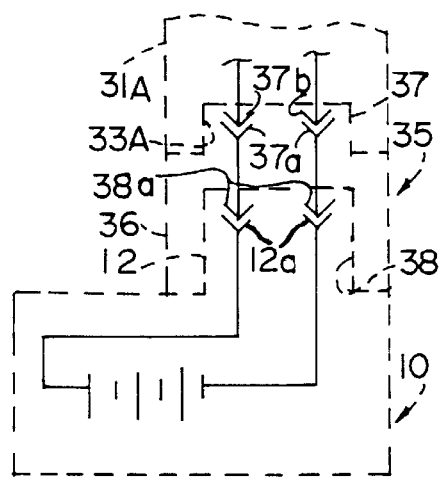
FIG. 8 is a schematic circuit diagram of the arrangement of FIG. 6.

For purposes of utilizing the battery packs of the present invention with existing power tools not specially designed for use with the battery packs of FIGS. 1 and 2, there is provided an adapter 35, illustrated in FIGS. 5 and 8. The adapter 35 has a housing 36 with an upstanding connecting portion 37, which is substantially the same as the corresponding connecting or turret portion of a prior-art battery pack of the type designed for use with a typical prior-art battery-powered power tool, such as that disclosed, for example, in U.S. Pat. No. 5,213,913, the disclosure of which is incorporated herein by reference. The connecting portion 37 includes electrical contacts 37a adapted to electrically engage mating contacts 37b in the associated power tool. Formed in the bottom surface of the housing 36 is a receptacle 38 dimensioned to mateably receive the connecting portion 12 of the battery pack 10 or the connector 14 of the battery pack 10 or the battery belt 20 of FIGS. 1 and 2. The receptacle 38 includes suitable electrical connectors 38a for electrical connection to the terminals 12a of the connector 14 or connecting portion 12 and to the connectors of the connecting portion 37.

Referring to FIGS. 6 and 8, there is illustrated a prior power tool 30A having a handle 31A with a standard battery pack receptacle or cavity 33A formed in the distal end surface 32A thereof. In use, the connecting portion 37 of the adapter 35 is plugged into the receptacle 33A, and the connecting portion 12 of the battery pack 10 (or the connector 14 of either the battery pack 10 or the battery belt 20) is in turn plugged into the receptacle 38 of the adapter 35.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A battery pack comprising:
   a small portable housing of a size adapted to be mounted on a power hand tool,
   a battery disposed in the housing and having positive and negative terminals,
   a plug portion projecting from the housing and adapted to be received in a socket portion in an associated power hand tool,
   first connector terminals on the plug portion respectively connected to the battery terminals,
   a cable connectable to the battery terminals and extending outside the housing to a distal end, and
   a plug connector having second Connector terminals connected to the distal end of the cable and adapted to be received in the socket portion in the associated power hand tool.

2. The battery pack of claim 1, wherein the battery is a rechargeable battery.

3. The battery pack of claim 1, wherein the plug portion is unitary with the housing.

4. In combination:
   a power hand tool having a socket formed therein, and tool terminals disposed in the socket; and
   a battery pack including a small portable housing of a size adapted to be mounted on the hand tool,
   a battery disposed in the housing and having positive and negative battery terminals,
   a plug portion projecting from the housing and adapted to be received in the socket of the hand tool for mounting the battery pack on the hand tool,
   first connector terminals on the plug portion respectively connected to the battery terminals and respectively connectable with the tool terminals when the plug portion is disposed in the socket,
   a cable connectable to the battery terminals and extending outside the battery pack housing to a distal end, and a plug connector having second connector terminals connected to the distal end of the cable, the connector being adapted to be received in the tool socket for connection of the second connector terminals to the tool terminals.

5. In combination:

a power band tool having a socket formed therein designed to directly receive a plug portion of a battery pack, and tool terminals disposed in socket;

an adapter body, an adapter plug portion projecting from the adapter body and mateably receivable in a mounted condition in the tool socket, first adapter terminals on the adapter plug portion connectable with the tool terminals when the adapter plug portion is disposed in the tool socket, an adapter socket in the body, and second adapter terminals in the adapter socket connected with the first adapter terminals; and a battery pack different from that which the power hand tool socket is designed to receive and including a small portable housing of a size adapted to be mounted on a power hand tool, a battery disposed in the housing and having positive and negative battery terminals, a battery pack plug portion projecting from the housing and adapted to be received in the adapter socket, and battery pack connector terminals on the battery pack plug portion respectively connectable with the adapter second terminals when the battery pack plug portion is disposed in the adapter socket, thereby to mount the battery pack on the tool and connect the battery terminals to the tool terminals although the battery pack plug portion does not mate with the tool socket.

* * * * *